(12) United States Patent
Okada et al.

(10) Patent No.: US 11,140,632 B2
(45) Date of Patent: Oct. 5, 2021

(54) IN-VEHICLE COMMUNICATION DEVICE

(71) Applicant: Sumitomo Wiring Systems, Ltd., Mie (JP)

(72) Inventors: Ryo Okada, Mie (JP); Masashi Nakano, Mie (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 7 days.

(21) Appl. No.: 16/708,791

(22) Filed: Dec. 10, 2019

(65) Prior Publication Data
US 2020/0205080 A1 Jun. 25, 2020

(30) Foreign Application Priority Data
Dec. 25, 2018 (JP) .............................. JP2018-241263

(51) Int. Cl.
| | | |
|---|---|---|
| *H04W 52/02* | (2009.01) | |
| *B60R 16/023* | (2006.01) | |
| *B60R 16/03* | (2006.01) | |
| *H04L 12/931* | (2013.01) | |
| *H04L 12/44* | (2006.01) | |
| *H04L 12/40* | (2006.01) | |

(52) U.S. Cl.
CPC ..... *H04W 52/0277* (2013.01); *B60R 16/0238* (2013.01); *B60R 16/03* (2013.01); *H04L 12/4015* (2013.01); *H04L 12/44* (2013.01); *H04L 49/351* (2013.01); *H04L 2012/40215* (2013.01); *H04L 2012/40273* (2013.01); *H04L 2012/445* (2013.01)

(58) Field of Classification Search
None
See application file for complete search history.

(56) References Cited

U.S. PATENT DOCUMENTS

| | | | |
|---|---|---|---|
| 2014/0023068 A1* | 1/2014 | Kim ................. | H04L 12/40006 370/355 |
| 2017/0302462 A1* | 10/2017 | Yun ......................... | H04L 12/10 |
| 2018/0141439 A1* | 5/2018 | Shin ........................ | B60L 58/12 |
| 2018/0148006 A1* | 5/2018 | Haga ................. | H04L 12/40169 |
| 2019/0092256 A1* | 3/2019 | Kim ....................... | H04B 3/548 |

(Continued)

FOREIGN PATENT DOCUMENTS

JP 2018-125601 A 8/2018

*Primary Examiner* — Ajit Patel
(74) *Attorney, Agent, or Firm* — Honigman LLP

(57) ABSTRACT

The in-vehicle communication device includes a CAN communication unit, an Ethernet communication unit, a controller that controls communication by the CAN communication unit and the Ethernet communication unit, a first voltage output unit that outputs a first voltage, and a second voltage output unit that outputs a second voltage lower than the first voltage. The second voltage output is applied to the Ethernet communication unit. The first voltage output by the first voltage output unit and the second voltage output by the second voltage output unit are applied to the CAN communication unit. An opening/closing unit is provided between the second voltage output unit and the Ethernet communication unit. When a predetermined operation in the vehicle has been detected, the controller puts the opening/closing unit into an open state and cuts off the supply of power from the second voltage output unit to the Ethernet communication unit.

11 Claims, 7 Drawing Sheets

(56) References Cited

U.S. PATENT DOCUMENTS

| | | | |
|---|---|---|---|
| 2020/0036717 A1* | 1/2020 | Akella | H04L 12/4625 |
| 2020/0180530 A1* | 6/2020 | Yasunori | B60R 16/0238 |
| 2020/0374151 A1* | 11/2020 | Meier | H04L 12/40 |
| 2021/0021443 A1* | 1/2021 | Stravers | G06F 1/3287 |

* cited by examiner

IN-VEHICLE COMMUNICATION DEVICE

CROSS-REFERENCE TO RELATED APPLICATIONS

This application claims priority of Japanese Patent Application No. JP 2018-241263 filed on Dec. 25, 2018, the contents of which are incorporated herein.

TECHNICAL FIELD

The present disclosure relates to an in-vehicle communication device.

BACKGROUND

As the number of on-board devices installed in vehicles continues to increase, so too does the number of on-board ECUs for controlling those on-board devices. These on-board ECUs are communicatively connected to each other over an in-vehicle network, and thus the scale of the in-vehicle network increases with the number of on-board ECUs that are installed. Accordingly, an in-vehicle communication device (gateway) which divides the in-vehicle network into a plurality of segments and relays communication between the on-board ECUs connected to different segments is known (e.g., JP 2018-125601A).

The in-vehicle communication device according to JP 2018-12560A includes a Controller Area Network (CAN; registered trademark) network channel and an Ethernet (registered trademark) network channel, and relays communication between these network channels.

JP 2018-125601A is an example of the related art.

SUMMARY

However, the in-vehicle communication device includes both CAN and Ethernet communication units, with each of the communication units requiring power in order to send data. The in-vehicle communication device according to JP 2018-125601A does not discuss reducing the amount of power consumed by the CAN and Ethernet communication units.

Having been achieved in light of such circumstances, an object of the present disclosure is to provide an in-vehicle communication device that can reduce the amount of power consumed.

An in-vehicle communication device according to one aspect of the present disclosure is an in-vehicle communication device that is installed in a vehicle and that communicates with an on-board ECU connected to a plurality of segments. The device includes: a CAN communication unit connected to a segment, among the plurality of segments, that corresponds to the CAN protocol; an Ethernet communication unit connected to a segment, among the plurality of segments, that corresponds to the Ethernet protocol; a controller that controls communication by the CAN communication unit and the Ethernet communication unit; a first voltage output unit that is connected to a power storage device installed in the vehicle and that outputs a first voltage; and a second voltage output unit that outputs a second voltage lower than the first voltage. The second voltage output by the second voltage output unit is applied to the Ethernet communication unit; the first voltage output by the first voltage output unit and the second voltage output by the second voltage output unit are applied to the CAN communication unit; an opening/closing unit is provided between the second voltage output unit and the Ethernet communication unit; and when a predetermined operation in the vehicle has been detected, the controller puts the opening/closing unit into an open state and cuts off the supply of power from the second voltage output unit to the Ethernet communication unit.

According to one aspect of the present disclosure, an in-vehicle communication device capable of reducing the amount of power consumed can be provided.

DETAILED DESCRIPTION OF PREFERRED EMBODIMENTS

Figure 1:
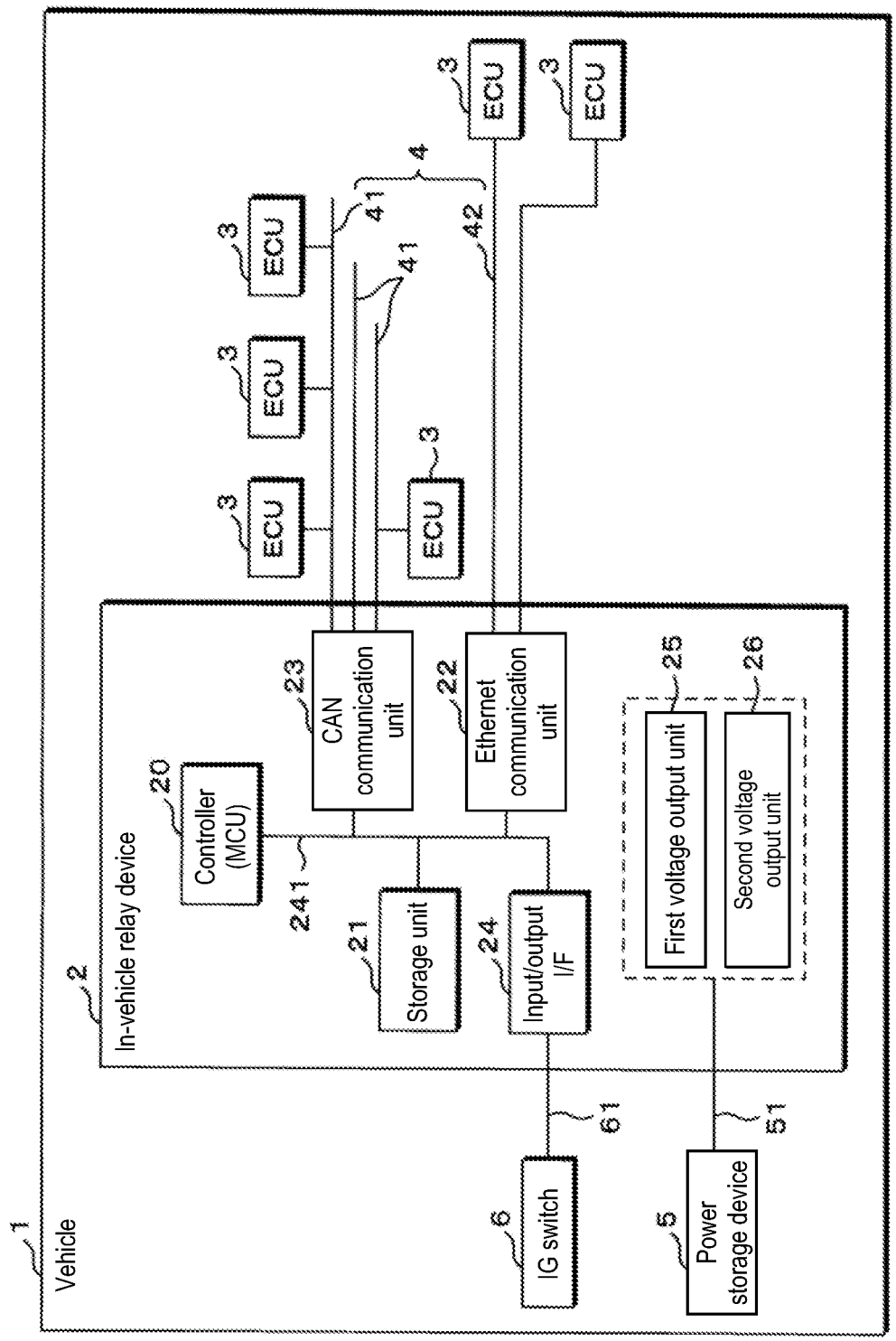
FIG. 1 is a block diagram illustrating an example of the configuration of an in-vehicle relay device according to a first embodiment.

First, aspects of the present disclosure will be described as examples. The aspects described hereinafter may be at least partially combined as desired.

An in-vehicle communication device according to one aspect of the present disclosure is an in-vehicle communication device that is installed in a vehicle and that communicates with an on-board ECU connected to a plurality of segments. The device includes: a CAN communication unit connected to a segment, among the plurality of segments, that corresponds to the CAN protocol; an Ethernet communication unit connected to a segment, among the plurality of segments, that corresponds to the Ethernet protocol; a controller that controls communication by the CAN communication unit and the Ethernet communication unit; a first voltage output unit that is connected to a power storage device installed in the vehicle and that outputs a first voltage; and a second voltage output unit that outputs a second voltage lower than the first voltage. The second voltage output by the second voltage output unit is applied to the Ethernet communication unit; the first voltage output by the first voltage output unit and the second voltage output by the second voltage output unit are applied to the CAN communication unit; an opening/closing unit is provided between the second voltage output unit and the Ethernet communication unit; and when a predetermined operation in the vehicle has been detected, the controller puts the opening/closing unit into an open state and cuts off the supply of power from the second voltage output unit to the Ethernet communication unit.

According to this aspect, when a predetermined operation in the vehicle has been detected, the controller puts the opening/closing unit into an open state and cuts off the supply of power from the second voltage output unit to the Ethernet communication unit. This makes it possible to reduce the amount of power consumed by the in-vehicle communication device.

In the in-vehicle communication device according to one aspect of the present disclosure, the first voltage output unit and the second voltage output unit are connected in series; the first voltage output unit outputs the first voltage having stepped down a voltage output from the power storage device installed in the vehicle; and the second voltage output unit outputs the second voltage having stepped down the first voltage output from the first voltage output unit.

According to this aspect, the first voltage is output having stepped down the voltage output from the power storage device, and the second voltage output unit outputs the second voltage having stepped down the first voltage. Accordingly, the second voltage is output having stepped down the voltage in stages so as to reduce the voltage difference produced by a single step-down, which makes it possible to suppress loss arising when the second voltage is generated.

In the in-vehicle communication device according to one aspect of the present disclosure, the first voltage is set to a differential voltage for sending a message from the CAN communication unit; and the second voltage is set to a driving voltage for driving the CAN communication unit.

It is necessary to apply voltages having two different voltage values (the first voltage and the second voltage) to the CAN communication unit, namely a driving voltage for driving the CAN communication unit itself, and a differential voltage for sending CAN messages. However, according to this aspect, the same second voltage is used as the driving voltage for driving the CAN communication unit itself and as the voltage for driving the Ethernet communication unit, and thus the in-vehicle communication device only need be provided with two voltage output units, which makes it possible to simplify the configuration.

In the in-vehicle communication device according to one aspect of the present disclosure, the controller is communicatively connected to an IG switch that turns power of the vehicle on or off; and the predetermined operation in the vehicle is an operation of turning the vehicle power off using the IG switch.

According to this aspect, dark current is reduced, which makes it possible to conserve power by reducing the amount of power consumed by the in-vehicle communication device.

In the in-vehicle communication device according to one aspect of the present disclosure, a second opening/closing unit is provided between the second voltage output unit and the CAN communication unit; and when a predetermined operation in the vehicle has been detected, the controller puts the second opening/closing unit into an open state and cuts off the supply of power from the second voltage output unit to the CAN communication unit.

According to this aspect, when a predetermined operation in the vehicle has been detected, the controller cuts off the supply of power to the CAN communication unit and the Ethernet communication unit. This makes it possible to further reduce the amount of power consumed by the in-vehicle communication device.

The present disclosure will now be described in detail on the basis of drawings illustrating embodiments thereof. An in-vehicle relay device 2 according to embodiments of the present disclosure will be described hereinafter with reference to the drawings. Note that the present disclosure is not intended to be limited to these examples, and is defined instead by the scope of the appended claims. All changes that fall within the same essential spirit and scope as the scope of the claims are intended to be included therein as well.

First Embodiment

FIG. 1 is a block diagram illustrating an example of the configuration of the in-vehicle relay device 2 according to a first embodiment. A power storage device 5, the in-vehicle relay device 2, and a plurality of on-board Electronic Control Units (ECUs) 3 communicatively connected to the in-vehicle relay device 2 are installed in a vehicle 1. The on-board ECUs 3 are connected to a CAN bus 41 or an Ethernet cable 42, and are communicatively connected to each other through the in-vehicle relay device 2 or directly. An in-vehicle LAN 4 is constituted by a plurality of segments, which in turn are constituted by the CAN bus 41 and the Ethernet cable 42. The in-vehicle relay device 2 corresponds to an in-vehicle communication device that communicates with the on-board ECUs 3 connected to a plurality of segments.

The in-vehicle relay device 2 relays messages exchanged between the plurality of on-board ECUs 3. The in-vehicle relay device 2 may send programs or data, which have been obtained from a program providing device (not shown) connected to an outside network via an outside communication device (not shown) having a wireless communication function, to the on-board ECUs 3 installed in the vehicle 1. The in-vehicle relay device 2 is connected to the power storage device 5 by a power cable 51, and operates by receiving power supplied from the power storage device 5.

An IG switch (ignition switch) 6, which starts or stops the vehicle 1, is communicatively connected to the in-vehicle relay device 2. The in-vehicle relay device 2 can receive a signal sent from the IG switch 6 (an IG switch on signal or an IG switch off signal) and obtain information pertaining to the state of the IG switch 6, e.g., on or off, on the basis of the received signal.

The in-vehicle relay device 2 includes a controller 20, a storage unit 21, an Ethernet communication unit 22, a CAN communication unit 23, an input/output I/F 24, a first voltage output unit 25, and a second voltage output unit 26. The controller 20, the storage unit 21, the Ethernet communication unit 22, the CAN communication unit 23, and the input/output I/F 24 are communicatively connected by an internal bus 241 for communication. The in-vehicle relay device 2 is a gateway (a relay device) that relays communication among the on-board ECUs 3 connected to the on-board communication units, which are constituted by the Ethernet communication unit 22 and the CAN communication unit 23.

The storage unit 21 is constituted by a volatile memory device such as Random Access Memory (RAM), or a non-volatile memory device such as Read-Only Memory (ROM), Electrically Erasable Programmable ROM (EEPROM), or flash memory. Control programs and data referenced during processing are stored in the storage unit 21 in advance. The control programs stored in the storage unit 21 may be control programs that have been stored after being read out from a recording medium (not shown) which can be read by the in-vehicle relay device 2. Alternatively, the control programs may be downloaded from an external computer (not shown) connected to a communication network (not shown), and stored in the storage unit 21. Information of the configurations of all of the on-board ECUs 3 installed in the vehicle 1 and routing information (a routing table) used in relay processing are stored in the storage unit 21.

The Ethernet communication unit 22 is an input/output interface (Ethernet PHY unit) that uses the Ethernet communication protocol. Through the Ethernet communication unit 22, the controller 20 communicates with the on-board ECUs 3, or other on-board devices such as relay devices, that are connected to the Ethernet cable 42. Although the drawings show only a single Ethernet communication unit 22 being provided, the configuration is not limited thereto. The in-vehicle relay device 2 may include a plurality of the Ethernet communication units 22, and packets may be relayed among Ethernet cables 42 connected to respective ones of the plurality of Ethernet communication units 22, i.e., among the on-board ECUs connected to respective ones of the Ethernet cables 42. The Ethernet communication unit 22 is constituted by an Integrated Circuit (IC), an Application-Specific Integrated Circuit (ASIC), a Field-Programmable Gate Array (FPGA), or the like, for example, and a driving voltage for driving the IC or the like (e.g., 3.3 V) is applied thereto.

The CAN communication unit 23 is an input/output interface (a CAN transceiver) that uses the Control Area Network (CAN) communication protocol. Through the CAN communication unit 23, the controller 20 communicates with the on-board ECUs 3, or other on-board devices such as relay devices, that are connected to the CAN bus 41. Although the drawings show only a single CAN communication unit 23 being provided, the configuration is not limited thereto. The in-vehicle relay device 2 may include a plurality of the CAN communication units 23, and CAN messages may be relayed among CAN buses 41 connected to respective ones of the plurality of CAN communication units 23. The CAN communication unit 23 is constituted by an IC, an ASIC, an FPGA, or the like, for example, and two voltages having different voltage values, namely a CAN differential voltage (e.g., 5 V) and a driving voltage for driving the IC (e.g., 3.3 V), are applied thereto.

The controller 20 is constituted by a Central Processing Unit (CPU), a Micro Processing Unit (MPU), a Micro Controller Unit (MCU), or the like, and carries out various types of control processes, computational processes, and the like by reading out and executing control programs and data stored in the storage unit 21 in advance.

The controller 20 carries out relay control by receiving and sending TCP/IP packets, for example, sent from the on-board ECUs 3 connected to the Ethernet cable 42, and may function as a layer 2 switch that carries out switching control on the basis of a Media Access Control (MAC) address included in the headers of the packets.

The controller 20 receives messages sent from the on-board ECUs 3 connected to the CAN bus 41 or sends messages to those on-board ECUs 3, and functions as a CAN controller, for example. The controller 20 may function as a CAN gateway that refers to a message identifier, such as a CAN-ID, included in the received message and relays that message on the basis of the referenced message identifier (CAN-ID) and the routing information (routing table) stored in the storage unit 21. Although the controller 20 is described as functioning as a CAN controller, the configuration is not limited thereto. The CAN communication unit 23 may function as a CAN transceiver and a CAN controller.

The input/output I/F 24 is a communication interface for serial communication, for example. The input/output I/F 24 and the IG switch 6 are connected by a wire harness 61, and thus the controller 20 obtains signals sent from the IG switch 6 through the input/output I/F 24.

The first voltage output unit 25 is a DC-DC converter or a Low Dropout (LD) regulator that steps down the voltage output from the power storage device 5 to output a first voltage, which is 5 V, for example.

The second voltage output unit 26 is a DC-DC converter or an LDO regulator that steps down the voltage output from the first voltage output unit 25 to output a second voltage, which is 3.3 V, for example. The connection between the first voltage output unit 25 and the second voltage output unit 26 will be described later. Thus the second voltage is set to a voltage value lower than the first voltage.

The IG switch (ignition switch) 6 is a switch that starts and stops the vehicle 1, and is turned on and off by an operator of the vehicle. When the IG switch 6 is turned on or off, the signal output (sent) from the IG switch 6 is obtained (received) by the controller 20 of the in-vehicle relay device 2 via the input/output I/F 24.

The power storage device 5 is a lead battery that outputs a voltage of 12 V, for example. Alternatively, the power storage device 5 may include a DC-DC converter or a regulator that takes a voltage output from a high-voltage battery such as a lithium-ion battery or an alternator and steps that voltage down to a predetermined voltage such as 12 V, for example.

Figure 2:
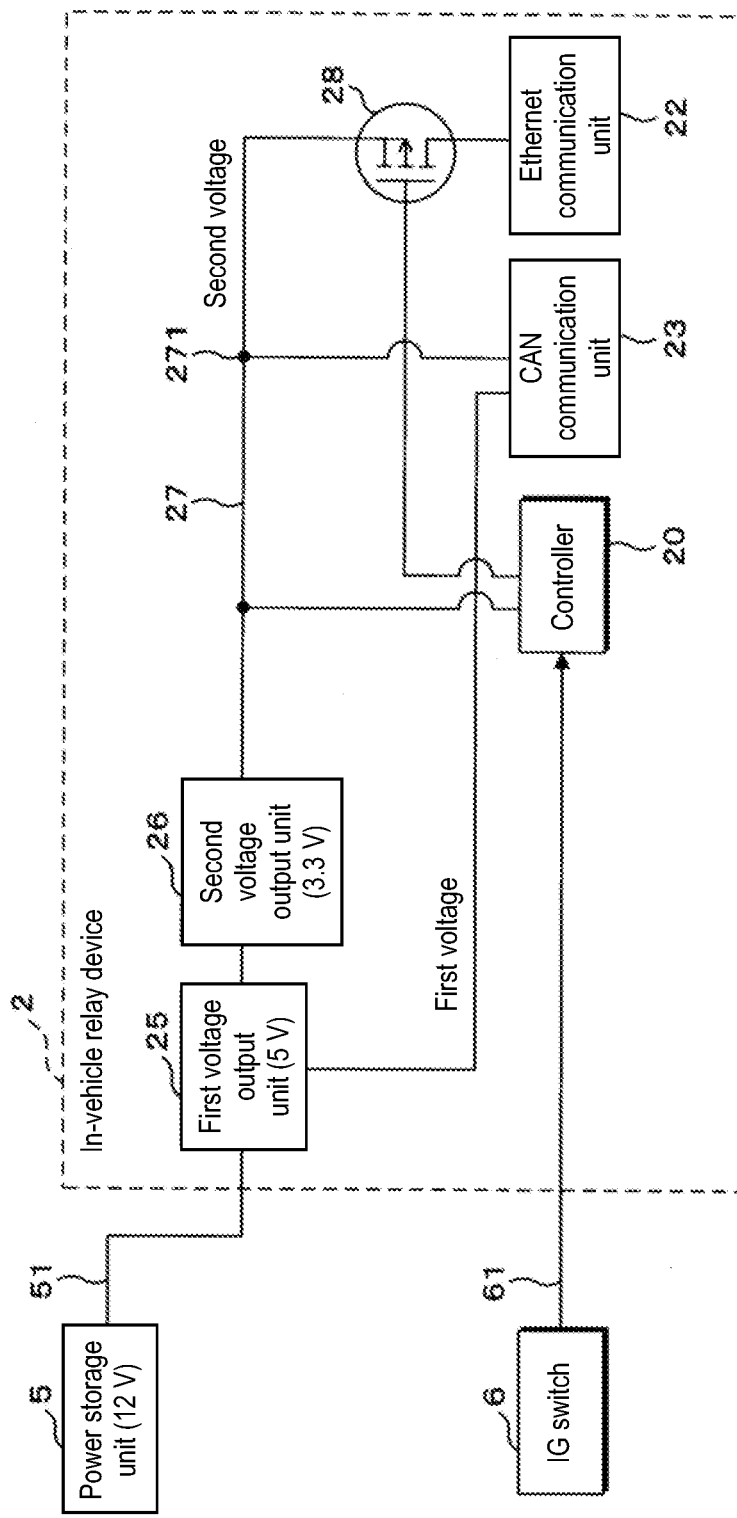
FIG. 2 is a circuit diagram illustrating an example of an overview of a power source circuit in the in-vehicle relay device.

FIG. 2 is a circuit diagram illustrating an example of an overview of a power source circuit in the in-vehicle relay device 2. The in-vehicle relay device 2 further includes an opening/closing unit 28, and the power source circuit of the in-vehicle relay device 2 is constituted by the first voltage output unit 25, the second voltage output unit 26, the controller 20, the CAN communication unit 23, the Ethernet communication unit 22, and the opening/closing unit 28.

The in-vehicle relay device 2 and the power storage device 5 are connected by the power cable 51, and the voltage output from the power storage device 5, e.g., 12 V, is applied to the in-vehicle relay device 2 via the power cable 51. As a result, power is supplied to the in-vehicle relay device 2 from the power storage device 5. A relay or a fuse may be provided partway along the connection between the in-vehicle relay device 2 and the power storage device 5. If the power storage device 5 is a high-voltage battery such as a lithium-ion battery, or if the voltage is applied via an alternator (a generator), a DC-DC converter or the like may be provided so that a voltage which has been stepped down to a voltage receivable by the in-vehicle relay device 2 is applied to the in-vehicle relay device 2.

The power cable 51 connected to the power storage device 5 is connected to the first voltage output unit 25. Using the flow of current as a reference, if the power storage device 5 is assumed to be located on an upstream side, the second voltage output unit 26 and the CAN communication unit 23 are each connected in parallel, on the downstream side of the first voltage output unit 25, by a power line 27. In other words, the first voltage output unit 25 and the second voltage output unit 26 are connected in series. The second voltage output unit 26 and the CAN communication unit 23 are connected in parallel. The power line 27 includes a cable and a conductive part such as lands or a wiring pattern formed on a printed circuit board, for example.

The power line 27 provided on the downstream side of the second voltage output unit 26 branches into three parts, with the branches of the power line 27 being connected to the controller 20, the CAN communication unit 23, and the Ethernet communication unit 22, respectively. In other words, the controller 20, the CAN communication unit 23, and the Ethernet communication unit 22 are connected to each other in parallel. As such, the second voltage output from the second voltage output unit 26 is applied to the controller 20, the CAN communication unit 23, and the Ethernet communication unit 22.

As described above, the CAN communication unit 23 is connected to the first voltage output unit 25 in series, and thus two voltages having different voltage values are applied to the CAN communication unit 23, i.e., the first voltage output from the first voltage output unit 25 and the second voltage output from the second voltage output unit 26. The voltage value of the first voltage is 5 V, for example, and the voltage value of the second voltage is 3.3 V for example. Thus, the second voltage is set to a lower voltage value than the first voltage. The second voltage applied to the CAN communication unit 23 is set to serve as a driving voltage for driving the IC or the like that constitutes the CAN communication unit 23. The first voltage applied to the CAN communication unit 23 is set to serve as a differential voltage (a potential difference between CAN_H and CAN_L) for carrying out CAN communication.

The opening/closing unit 28 is provided in the power line 27 that connects the second voltage output unit 26 and the Ethernet communication unit 22, between the Ethernet communication unit 22, and a branch point 271 that branches to the CAN communication unit 23 and the Ethernet communication unit 22.

The opening/closing unit 28 is constituted by a P-type Field Effect Transistor (FET), for example, and the power line 27 (signal line) extending from the controller 20 is connected to the gate terminal of the P-type FET. The source terminal of the P-type FET is connected to the second voltage output unit 26 side, and the drain terminal is connected to the Ethernet communication unit 22 side. The opening/closing unit 28 (the P-type FET) is controlled to open or close (turn on or off) on the basis of a control signal output from the controller 20. The opening/closing unit 28 is not limited to a P-type FET, and may be another semiconductor switch such as an N-type FET or an IGBT, or a mechanical relay.

As described above, a signal from the IG switch 6 (the IG switch 6 on signal or the IG switch 6 off signal) is input to the controller 20 via the input/output I/F 24 (see FIG. 1). The controller 20 obtains the signal from the IG switch 6, input via the input/output I/F 24, and controls the opening/closing unit 28 to open or close (turn on or off) on the basis of that signal. The controller 20 opens (turns off) the opening/closing unit 28 when a signal indicating that the IG switch 6 has turned off (the vehicle 1 has been stopped) (the IG switch 6 off signal) has been obtained. The controller 20 closes (turns on) the opening/closing unit 28 when a signal indicating that the IG switch 6 has turned on (the vehicle 1 has turned on) (the IG switch 6 on signal) has been obtained.

When detecting a predetermined operation in the vehicle 1, the controller 20 detects an operation for turning the power of the vehicle 1 off using the IG switch 6 on the basis of a signal from the IG switch 6, and then opens (turns off) the opening/closing unit 28 when the power of the vehicle 1 has turned off. When the opening/closing unit 28 opens (turns off), the supply of power from the second voltage output unit 26 to the Ethernet communication unit 22 is cut off. Current flowing in the vehicle 1 while the IG switch 6 is off (while the vehicle 1 is stopped) is called "dark current". When the IG switch 6 has been turned off, the controller 20 opens (turns off) the opening/closing unit 28 to cut off the supply of power from the second voltage output unit 26 to the Ethernet communication unit 22, which makes it possible to reduce dark current and suppress a situation in which the amount of power stored in the power storage device 5 drops.

Using the direction in which current flows as a reference, when the power storage device 5 is located on the upstream side, the first voltage output unit 25 and the second voltage output unit 26 are connected in series, with the first voltage output unit 25 on the upstream side. As described above, the second voltage output by the second voltage output unit 26 is a lower voltage than the first voltage output by the first voltage output unit 25. As such, connecting the first voltage output unit 25 and the second voltage output unit 26 in series makes it possible to reduce the amount by which the voltage is stepped down by the second voltage output unit 26, and thus reduce loss caused by the second voltage output unit 26, as compared to a case where the first voltage output unit 25 and the second voltage output unit 26 are connected in parallel.

It is desirable that the first voltage output unit 25 be constituted by a DC-DC converter, and that the second voltage output unit 26 be constituted by a Low Dropout (LDO) regulator. The first voltage output unit 25 steps the voltage output from the power storage device 5 down by half or more, and thus loss caused by the step-down carried out using the switching element included in the DC-DC converter can be reduced. The second voltage output unit 26 further steps down the voltage already stepped down by the first voltage output unit 25, and thus the amount by which the voltage is stepped down is lower than with the first voltage output unit 25. However, using an LDO regulator makes it possible to stabilize the output voltage, even if there is little difference between the input voltage and the output voltage.

Figure 3:
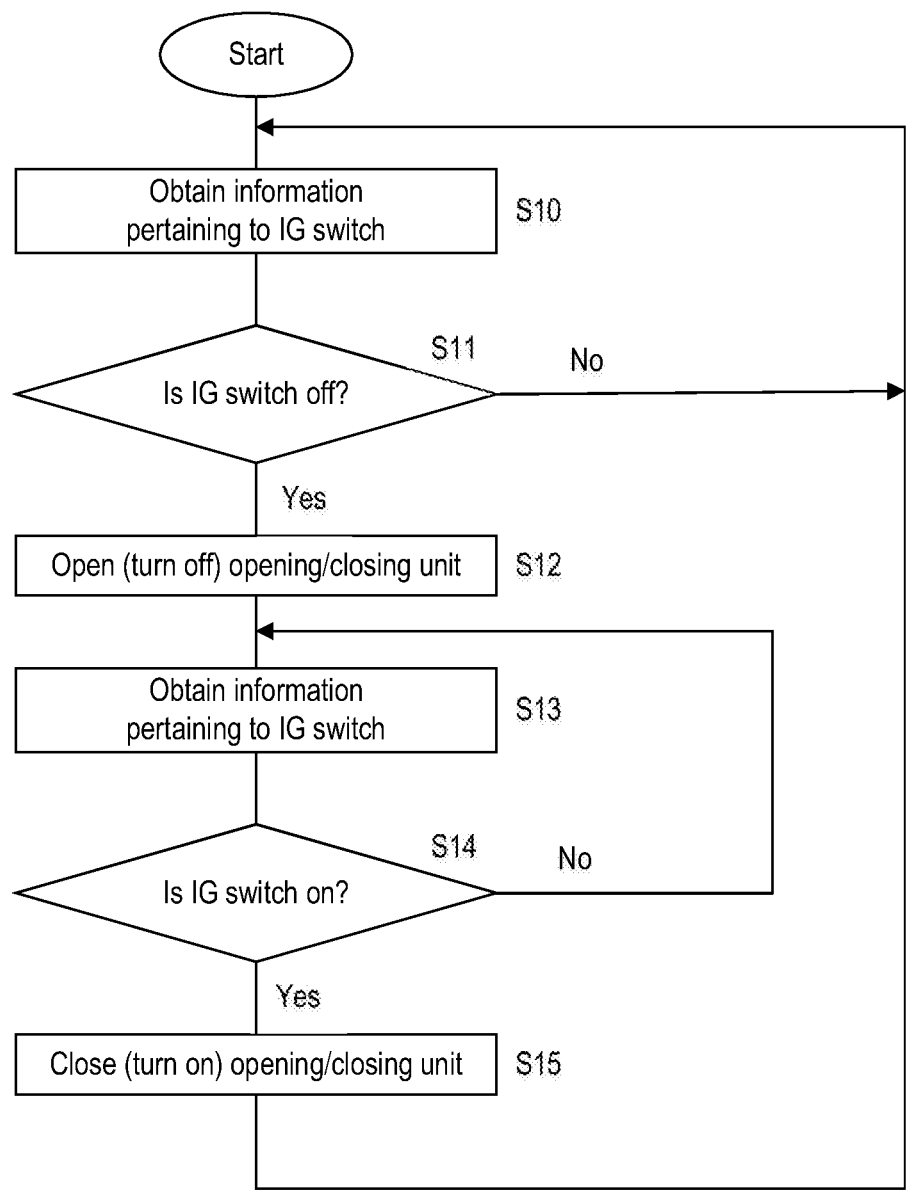
FIG. 3 is a flowchart illustrating an example of processing carried out by a controller in the in-vehicle relay device.

FIG. 3 is a flowchart illustrating an example of processing carried out by the controller 20 in the in-vehicle relay device 2. The controller 20 of the in-vehicle relay device 2 periodically or continually carries out the following processing.

The controller 20 obtains information pertaining to the IG switch 6 (S10). The controller 20 obtains the signal output from the IG switch 6 (the IG switch 6 on signal or the IG switch 6 off signal) via the input/output I/F 24.

The controller 20 determines whether or not the IG switch 6 is off (S11). The controller 20 determines whether or not the IG switch 6 is off on the basis of the signal obtained from the IG switch 6. In other words, the controller 20 determines that the IG switch 6 is off when the IG switch 6 off signal has been obtained as the information pertaining to the IG switch 6, for example.

If the IG switch 6 is not off (S11: NO), the controller 20 loops the process to execute the process of S10 again. If, for example, the IG switch 6 off signal has not been obtained, it is determined that the IG switch 6 is not turned off (the IG switch 6 is on), and thus the controller 20 loops the process to execute the process of S10 again. In other words, the controller 20 continuously or periodically obtains the information pertaining to the IG switch 6 until the IG switch 6 turns off (the vehicle 1 is stopped) as a predetermined operation of the vehicle 1.

If the IG switch 6 is off (S11: YES), the controller 20 opens (turns off) the opening/closing unit 28 (S12). The controller 20 opens (turns off) the opening/closing unit 28 when the IG switch 6 off signal has been obtained, for example. If the opening/closing unit 28 is constituted by a P-type FET, for example, the controller 20 sends a signal (applies a gate voltage) so that the source and gate potentials become approximately equal, which turns the P-type FET, which is the opening/closing unit 28, off. By opening (turning off) the opening/closing unit 28, the supply of power from the second voltage output unit 26 to the Ethernet communication unit 22 is cut off. Accordingly, power consumption by the Ethernet communication unit 22 can be eliminated, and dark current arising when the IG switch 6 is off (when the vehicle 1 is stopped) can be reduced.

The controller 20 obtains information pertaining to the IG switch 6 (S13). The controller 20 obtains the information pertaining to the IG switch 6 in the same manner as in the process of S10. As illustrated in FIG. 2, the opening/closing unit 28 is not provided between the controller 20 and the second voltage output unit 26, and thus the supply of power from the second voltage output unit 26 to the controller 20 continues even while the opening/closing unit 28 is open (off).

The controller 20 determines whether or not the IG switch 6 is on (S14). The controller 20 determines whether or not the IG switch 6 is on on the basis of the signal obtained from the IG switch 6. In other words, the controller 20 determines that the IG switch 6 is on when the IG switch 6 on signal has been obtained as the information pertaining to the IG switch 6, for example.

If the IG switch 6 is not on (S14: NO), the controller 20 loops the process to execute the process of S13 again. If, for example, the IG switch 6 on signal has not been obtained, it is determined that the IG switch 6 is not turned on (the IG switch 6 is off), and thus the controller 20 loops the process to execute the process of S13 again. In other words, the controller 20 continuously or periodically obtains the information pertaining to the IG switch 6 until the IG switch 6 turns on (the vehicle 1 is started up) as a predetermined operation of the vehicle 1.

If the IG switch 6 is on (S14: YES), the controller 20 closes (turns on) the opening/closing unit 28 (S15). The controller 20 closes (turns on) the opening/closing unit 28 when the IG switch 6 on signal has been obtained, for example. If the opening/closing unit 28 is constituted by a P-type FET, for example, the controller 20 sends a signal (applies a gate voltage) or stops sending a signal (stops applying a gate voltage) so that the gate potential drops below the source potential, which turns the P-type FET, which is the opening/closing unit 28, on. By closing (turning on) the opening/closing unit 28, the supply of power from the second voltage output unit 26 to the Ethernet communication unit 22 is resumed. When the supply of power is resumed, the Ethernet communication unit 22 is driven, and thus the relay and so on of packets received via the Ethernet cable 42 is resumed as well.

After the process of S15 is executed, the controller 20 loops the process to execute the process of S10 again. After the process of S15 is executed, the controller 20 loops the process to execute the process of S10 again, and resumes the process of obtaining the information pertaining to the IG switch 6.

By the controller 20 opening (turning off) the opening/closing unit 28 on the basis of the IG switch 6 being turned off (the vehicle 1 being stopped) as the predetermined operation of the vehicle 1, the supply of power from the second voltage output unit 26 to the Ethernet communication unit 22 can be cut off, and the dark current can be reduced.

The predetermined operation in the vehicle 1 is not limited to an operation pertaining to turning the IG switch 6 off. The operation may be any operation that transitions the state of the vehicle 1 to a state in which the supply of power to the Ethernet communication unit 22 can be cut off. With the IG switch 6 off or on, the controller 20 may further detect the start of charging in the vehicle 1, or the start of updates to (reprogramming of) the programs of the on-board ECUs 3 connected to the CAN communication unit 23, as the predetermined operation in the vehicle 1, and open (turn off) the opening/closing unit 28. The controller 20 may open (turn off) the opening/closing unit 28 when an operation for transitioning the state of the vehicle 1 to a state in which the supply of power to the Ethernet communication unit 22 can be cut off has been detected.

Although the descriptions in the present embodiment are given based on the in-vehicle relay device 2, with the in-vehicle relay device 2 corresponding to the in-vehicle communication device, the configuration is not limited thereto.

The in-vehicle relay device 2 is merely one example of the in-vehicle communication device. The in-vehicle communication device includes ECUs, on-board apparatuses, or on-board devices which have CAN and Ethernet communication functions using the CAN communication unit 23 and the Ethernet communication unit 22, e.g., body ECUs or the like.

Second Embodiment

Figure 4:
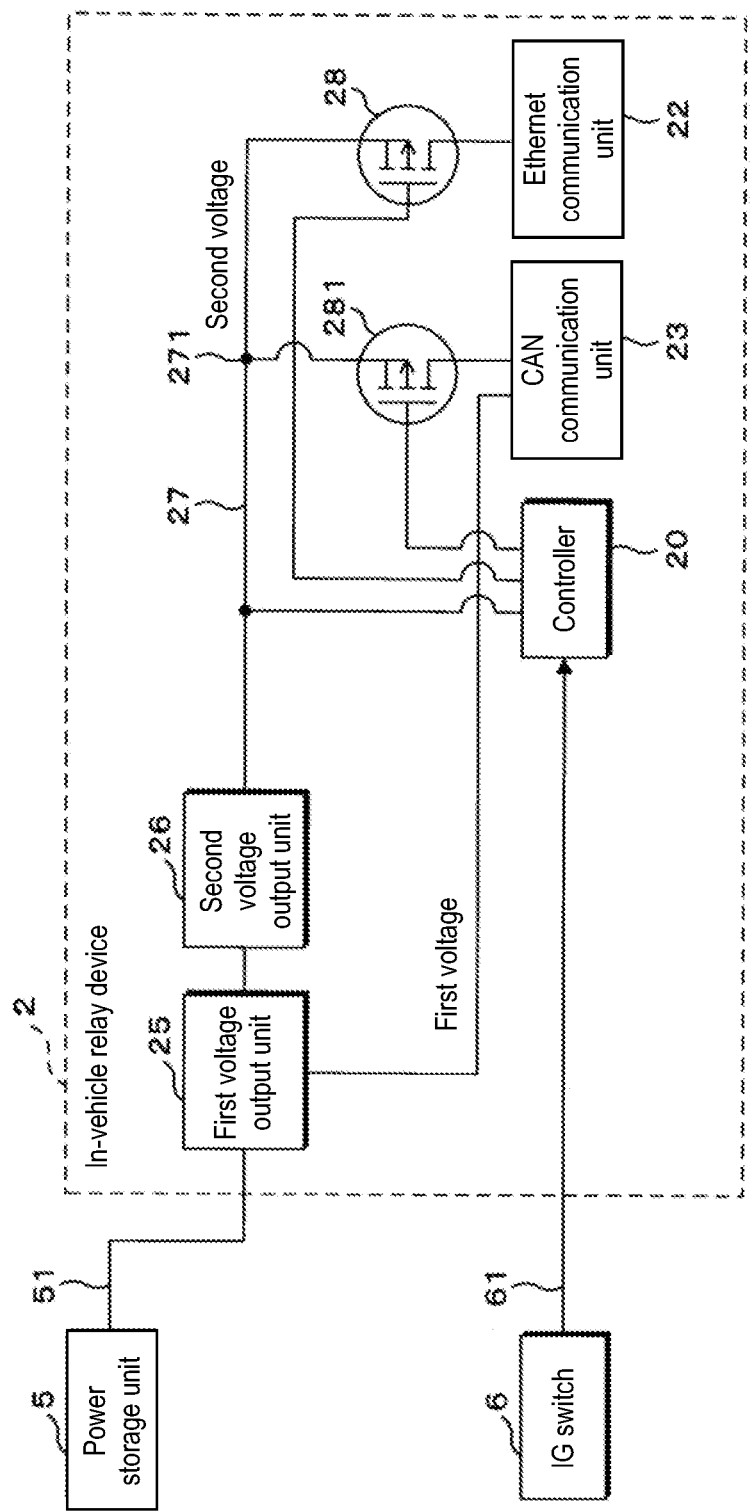
FIG. 4 is a circuit diagram illustrating an example of an overview of a power source circuit in an in-vehicle relay device according to a second embodiment.

FIG. 4 is a circuit diagram illustrating an example of an overview of a power source circuit in the in-vehicle relay device 2 according to a second embodiment. The in-vehicle relay device 2 of the second embodiment differs from that of the first embodiment in that a second opening/closing unit 281 which cuts off the supply of power to the CAN communication unit 23 is included. Like the first embodiment, the in-vehicle relay device 2 of the second embodiment includes the opening/closing unit 28, and the power source circuit of the in-vehicle relay device 2 is constituted by the first voltage output unit 25, the second voltage output unit 26, the controller 20, the CAN communication unit 23, the Ethernet communication unit 22, and the opening/closing unit 28.

The in-vehicle relay device 2 of the second embodiment further includes the second opening/closing unit 281 between the CAN communication unit 23, and the branch point 271 that branches to the CAN communication unit 23 and the Ethernet communication unit 22 in the power line 27. In other words, the second opening/closing unit 281 is provided in the power line 27 that connects the second voltage output unit 26 and the CAN communication unit 23, between the CAN communication unit 23, and the branch point 271 that branches to the CAN communication unit 23 and the Ethernet communication unit 22.

Like the opening/closing unit 28, the second opening/closing unit 281 is constituted by a P-type FET, for example. The power line 27 (signal line) extending from the controller 20 is connected to the gate terminal of the P-type FET that is the second opening/closing unit 281. The source terminal of the P-type FET that is the second opening/closing unit 281 is connected to the second voltage output unit 26 side, and the drain terminal is connected to the CAN communication unit 23 side. The second opening/closing unit 281 (the P-type FET) is controlled to open or close (turn on or off) on the basis of a control signal output from the controller 20.

The second opening/closing unit 281 (the P-type FET) is controlled to open or close (turn on or off) on the basis of a control signal output from the controller 20. The second opening/closing unit 281 is not limited to a P-type FET, and may be another semiconductor switch such as an N-type FET or an IGBT, or a mechanical relay.

As in the first embodiment, the controller 20 opens (turns off) the opening/closing unit 28 and the second opening/closing unit 281 when, for example, the IG switch 6 has turned off (the vehicle 1 has been stopped) as a predetermined operation in the vehicle 1. Opening (turning off) the opening/closing unit 28 and the second opening/closing unit 281 when the IG switch 6 has turned off cuts off the supply of power from the second voltage output unit 26 to the Ethernet communication unit 22 and the CAN communication unit 23, which makes it possible to further reduce dark current.

As in the first embodiment, the controller 20 closes (turns on) the opening/closing unit 28 and the second opening/closing unit 281 when the IG switch 6 has turned on (the vehicle 1 has started up), for example, which drives the Ethernet communication unit 22 and the CAN communication unit 23 so that the communication by those communication units resumes.

Third Embodiment

Figure 5:
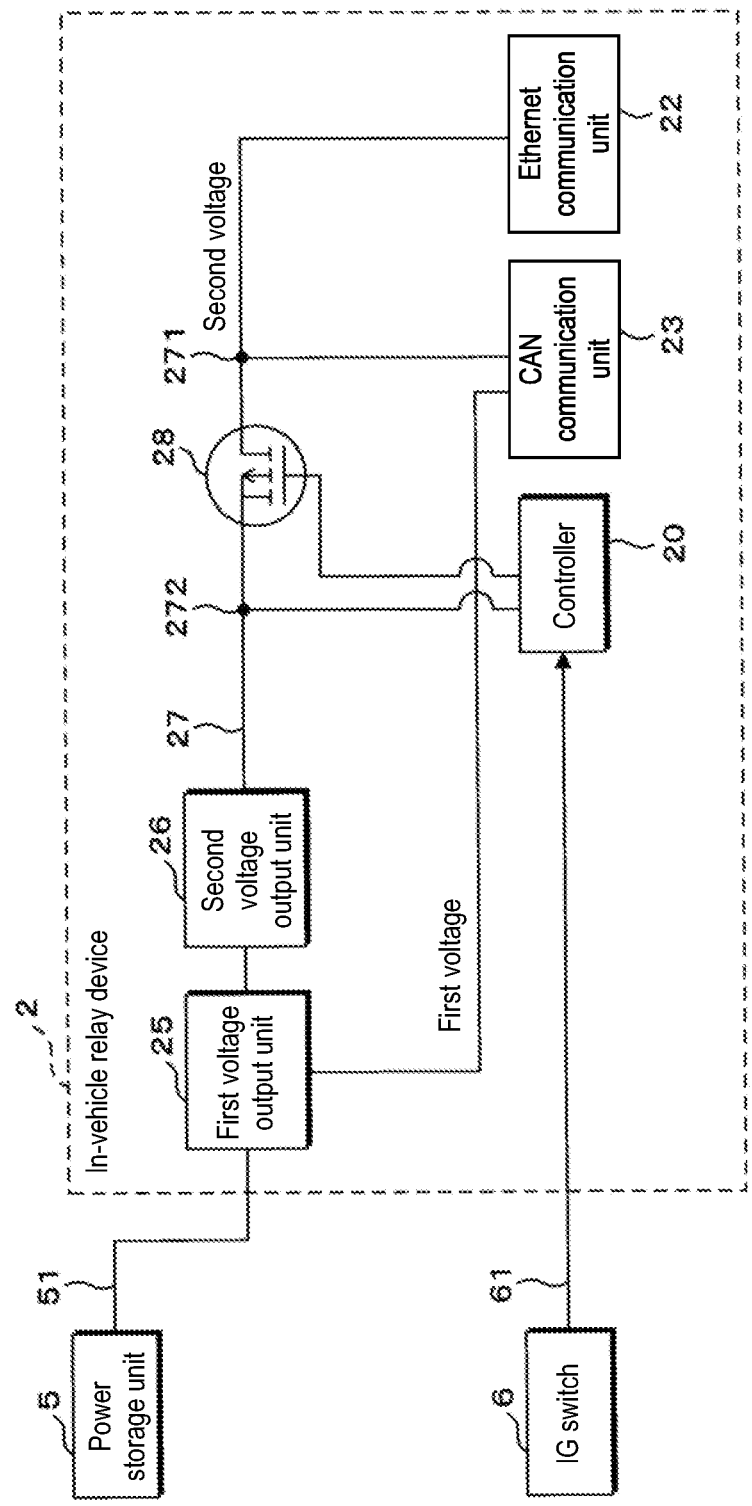
FIG. 5 is a circuit diagram illustrating an example of an overview of a power source circuit in an in-vehicle relay device according to a third embodiment.

FIG. 5 is a circuit diagram illustrating an example of an overview of a power source circuit in the in-vehicle relay device 2 according to a third embodiment. The in-vehicle relay device 2 of the third embodiment differs from that of the first embodiment in that the opening/closing unit 28 is provided further on the second voltage output unit 26 side than the branch point 271 which branches to the CAN communication unit 23 and the Ethernet communication unit 22. Like the first embodiment, the in-vehicle relay device 2 of the third embodiment includes the opening/closing unit 28, and the power source circuit of the in-vehicle relay device 2 is constituted by the first voltage output unit 25, the second voltage output unit 26, the controller 20, the CAN communication unit 23, the Ethernet communication unit 22, and the opening/closing unit 28.

The opening/closing unit 28 included in the in-vehicle relay device 2 of the third embodiment is provided in the power line 27 connecting the second voltage output unit 26 and the CAN communication unit 23, between a branch point 272 that branches to the controller 20 and the CAN communication unit 23/the Ethernet communication unit 22, and the branch point 271 that branches to the CAN communication unit 23 and the Ethernet communication unit 22.

As in the first embodiment, the opening/closing unit 28 of the third embodiment is constituted by a P-type FET, for example, and the power line 27 (signal line) extending from the controller 20 is connected to the gate terminal of the P-type FET. The source terminal of the P-type FET is connected to the second voltage output unit 26 side (the branch point 272 side), and the drain terminal is connected to the CAN communication unit 23 side (the branch point 271 side). The opening/closing unit 28 (the P-type FET) is controlled to open or close (turn on or off) on the basis of a control signal output from the controller 20. The opening/closing unit 28 is not limited to a P-type FET, and may be another semiconductor switch such as an N-type FET or an IGBT, or a mechanical relay.

As in the first embodiment, the controller 20 opens (turns off) the opening/closing unit 28 when, for example, the IG switch 6 has turned off (the vehicle 1 has been stopped) as a predetermined operation in the vehicle 1. Opening (turning off) the opening/closing unit 28 when the IG switch 6 has turned off cuts off the supply of power from the second voltage output unit 26 to the Ethernet communication unit 22 and the CAN communication unit 23, which makes it possible to further reduce dark current.

As in the first embodiment, the controller 20 closes (turns on) the opening/closing unit 28 when the IG switch 6 has turned on (the vehicle 1 has started up), for example, which drives the Ethernet communication unit 22 and the CAN communication unit 23 so that the communication by those communication units resumes.

By providing the opening/closing unit 28 between the branch point 272, which branches to the controller 20 and the CAN communication unit 23/the Ethernet communication unit 22, and the branch point 271, which branches to the CAN communication unit 23 and the Ethernet communication unit 22, or in other words, further on the second voltage output unit 26 side than the branch point 271 which branches to the CAN communication unit 23 and the Ethernet communication unit 22, the supply of power to the Ethernet communication unit 22 and the CAN communication unit 23 can be cut off by the single opening/closing unit 28.

First Variation

Figure 6:
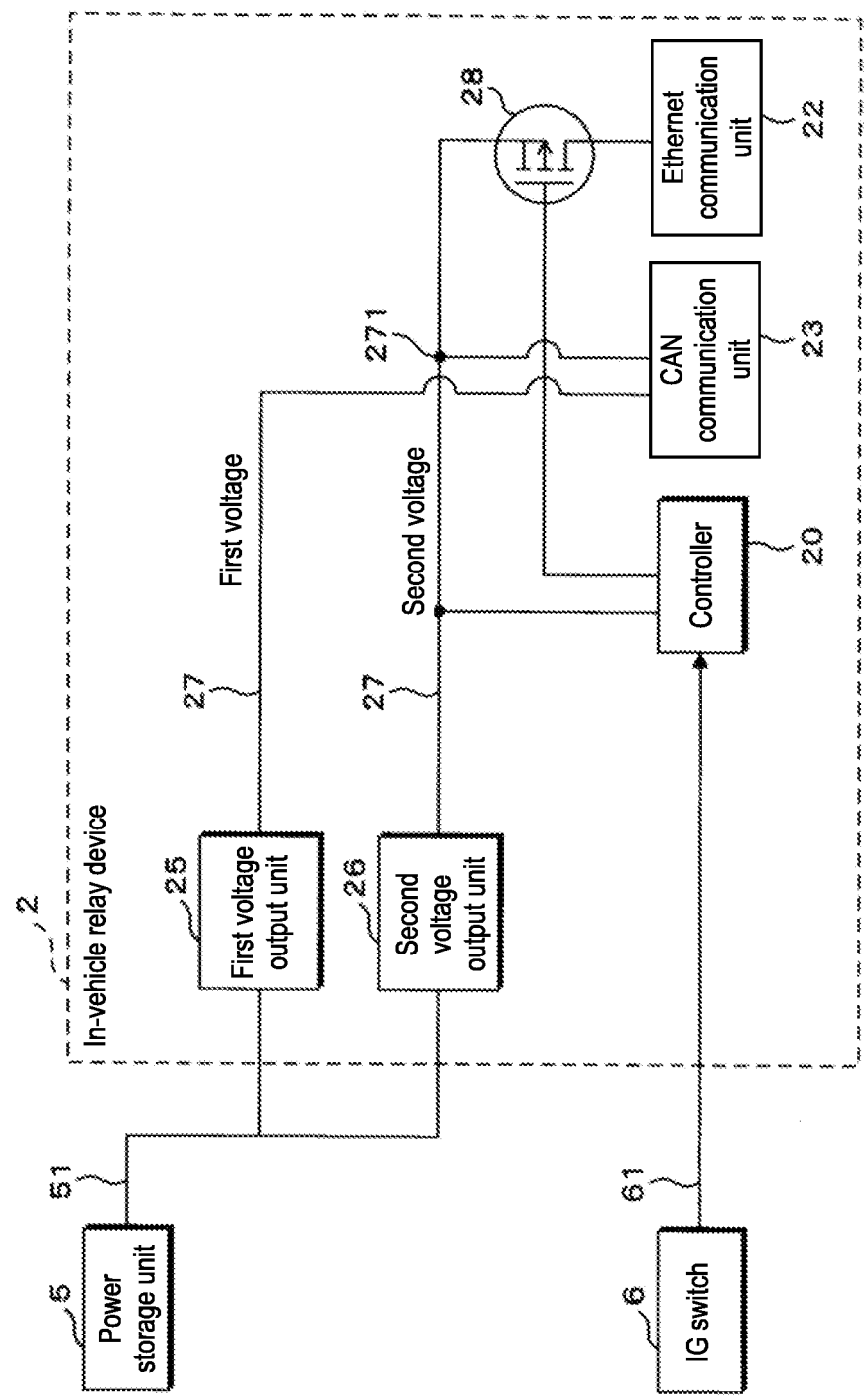
FIG. 6 is a circuit diagram illustrating an example of an overview of a power source circuit in an in-vehicle relay device according to a first variation.

FIG. 6 is a circuit diagram illustrating an example of an overview of a power source circuit in the in-vehicle relay device 2 according to a first variation. The in-vehicle relay device 2 of the first variation differs from that of the first embodiment in that the first voltage output unit 25 and the second voltage output unit 26 are provided in parallel. The in-vehicle relay device 2 of the first variation includes the opening/closing unit 28, and the power source circuit of the in-vehicle relay device 2 is constituted by the first voltage output unit 25, the second voltage output unit 26, the controller 20, the CAN communication unit 23, the Ethernet communication unit 22, and the opening/closing unit 28.

The first voltage output unit 25 and the second voltage output unit 26 are provided in parallel in the first variation. The power cable 51 connecting the in-vehicle relay device 2 and the power storage device 5 branches between the power storage device 5 and the first voltage output unit 25/the second voltage output unit 26, and the branches from the power cable 51 are connected to the first voltage output unit 25 and the second voltage output unit 26, respectively.

The connections between the first voltage output unit 25 and the second voltage output unit 26 provided in parallel, and the controller 20, the Ethernet communication unit 22, and the CAN communication unit 23, are the same as in the first embodiment. As in the first embodiment, the controller 20 controls the opening/closing unit 28 to open and close (turn on and off).

By connecting the first voltage output unit 25 and the second voltage output unit 26 in parallel, the second voltage output unit 26 continues to output the second voltage even if the first voltage output unit 25 cannot output the first voltage, which makes it possible to continue driving the controller 20 and the Ethernet communication unit 22.

The parallel connection of the first voltage output unit 25 and the second voltage output unit 26 according to this variation may be combined with the format of the connection of the opening/closing unit 28 or the second opening/closing unit 281 according to the second embodiment or the third embodiment as well.

Second Variation

Figure 7:
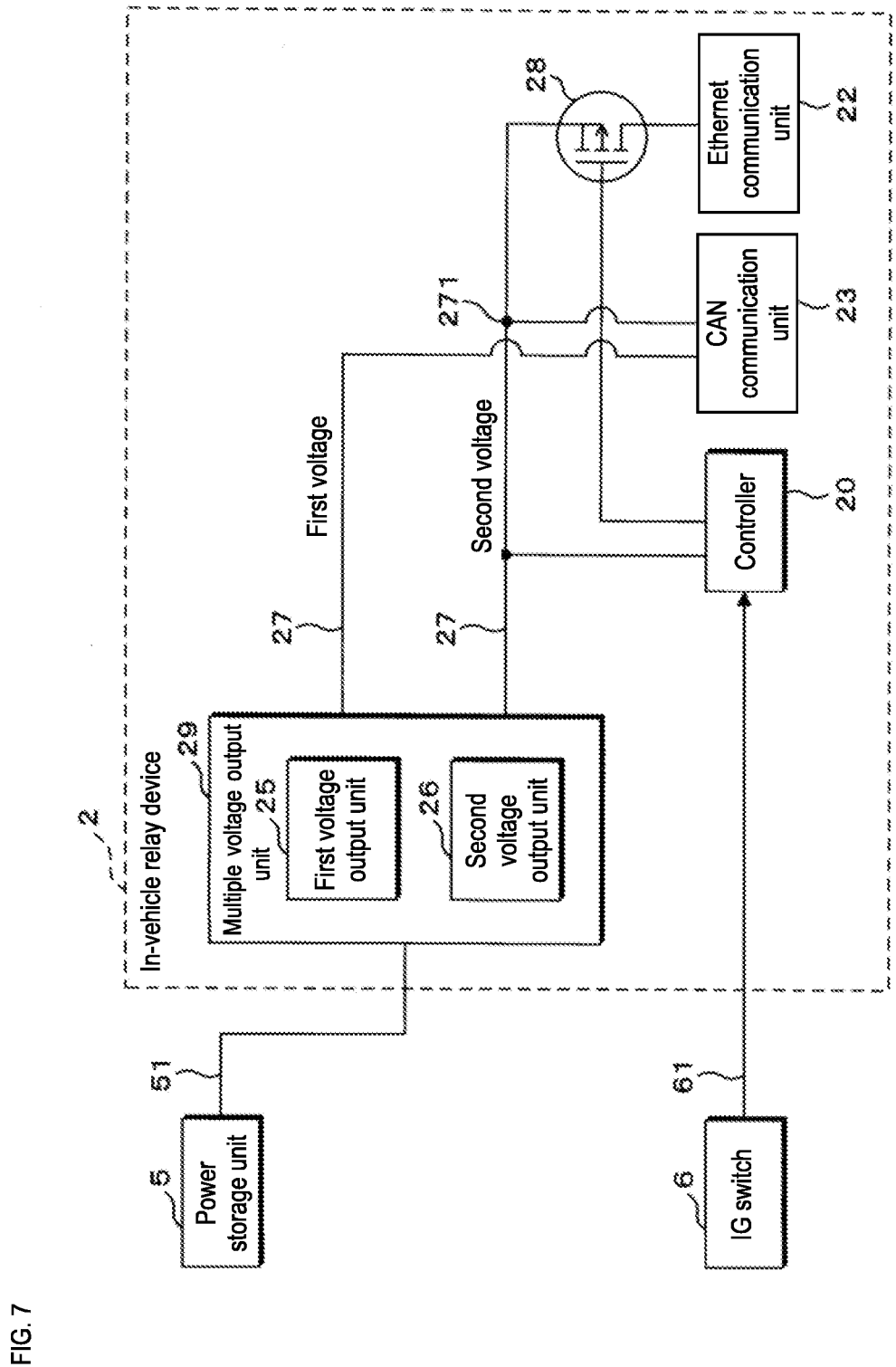
FIG. 7 is a circuit diagram illustrating an example of an overview of a power source circuit in an in-vehicle relay device according to a second variation.

FIG. 7 is a circuit diagram illustrating an example of an overview of a power source circuit in the in-vehicle relay device 2 according to a second variation. The in-vehicle relay device 2 of the second variation differs from that of the first embodiment in that a multiple voltage output unit 29 is provided, the multiple voltage output unit 29 outputting two different voltages, namely the first voltage and the second voltage. The in-vehicle relay device 2 of the second variation includes the multiple voltage output unit 29 which outputs two different voltages, namely the first voltage and the second voltage, and which essentially encapsulates the first voltage output unit 25 and the second voltage output unit 26.

The power cable 51 connected to the power storage device 5 is connected to the multiple voltage output unit 29. The multiple voltage output unit 29 outputs the two different voltages, i.e., the first voltage and the second voltage, and the output terminal for the first voltage is connected to the CAN communication unit 23 by the power line 27. Likewise, the output terminal for the second voltage is connected to the controller 20, the Ethernet communication unit 22, and the CAN communication unit 23 by three respective branches from the power line 27.

The multiple voltage output unit 29 encapsulates the first voltage output unit 25 and the second voltage output unit 26, for example, and may have a circuit configuration in which the first voltage output unit 25 and the second voltage output unit 26 are connected in series or in parallel.

Using the multiple voltage output unit 29 makes it possible to reduce the mounting surface area on the board on which electrical components such as the multiple voltage output unit 29 and the controller 20 are mounted.

The multiple voltage output unit 29 according to this variation may be combined with the format of the connection of the opening/closing unit 28 or the second opening/closing unit 281 according to the second embodiment or the third embodiment as well.

The embodiments disclosed here are intended to be in all ways exemplary and in no ways limiting. The scope of the present disclosure is defined not by the above-described examples but by the scope of the claims, and all modifications equivalent in meaning and scope to the scope of the claims are intended to be included therein.

What is claimed is:

1. An in-vehicle communication device that is installed in a vehicle and that communicates with an on-board Engine Control Unit ("ECU") connected to a plurality of segments, the device comprising:
   a Controller Area Network ("CAN") communication unit connected to a segment, among the plurality of segments, that corresponds to the CAN protocol;
   an Ethernet communication unit connected to a segment, among the plurality of segments, that corresponds to the Ethernet protocol;
   a controller that controls communication by the CAN communication unit and the Ethernet communication unit;
   a first voltage output unit that is connected to a power storage device installed in the vehicle and that outputs a first voltage; and
   a second voltage output unit connected to the first voltage output unit, the second voltage output unit outputting a second voltage that is lower than the first voltage,
   wherein the second voltage output by the second voltage output unit is applied to the Ethernet communication unit;
   the first voltage output by the first voltage output unit and the second voltage output by the second voltage output unit are applied to the CAN communication unit;
   an opening/closing unit is provided between the second voltage output unit and the Ethernet communication unit; and
   when a predetermined operation in the vehicle has been detected, the controller puts the opening/closing unit into an open state and cuts off the supply of power from the second voltage output unit to the Ethernet communication unit.

2. The in-vehicle communication device according to claim 1, wherein the first voltage output unit and the second voltage output unit are connected in series;
   the first voltage output unit outputs the first voltage having stepped down a voltage output from the power storage device installed in the vehicle; and
   the second voltage output unit outputs the second voltage having stepped down the first voltage output from the first voltage output unit.

3. The in-vehicle communication device according to claim 1, wherein the first voltage is set to a differential voltage for sending a message from the CAN communication unit; and
   the second voltage is set to a driving voltage for driving the CAN communication unit.

4. The in-vehicle communication device according to claim 1, wherein the controller is communicatively connected to an Ignition ("IG") switch that turns power of the vehicle on or off; and
   the predetermined operation in the vehicle is an operation of turning the vehicle power off using the IG switch.

5. The in-vehicle communication device according to claim 1, wherein a second opening/closing unit is provided between the second voltage output unit and the CAN communication unit; and
   when a predetermined operation in the vehicle has been detected, the controller puts the second opening/closing unit into an open state and cuts off the supply of power from the second voltage output unit to the CAN communication unit.

6. The in-vehicle communication device according to claim 2, wherein the first voltage is set to a differential voltage for sending a message from the CAN communication unit; and
   the second voltage is set to a driving voltage for driving the CAN communication unit.

7. The in-vehicle communication device according to claim 2, wherein the controller is communicatively connected to an Ignition ("IG") switch that turns power of the vehicle on or off; and
   the predetermined operation in the vehicle is an operation of turning the vehicle power off using the IG switch.

8. The in-vehicle communication device according to claim 3, wherein the controller is communicatively connected to an Ignition ("IG") switch that turns power of the vehicle on or off; and
   the predetermined operation in the vehicle is an operation of turning the vehicle power off using the IG switch.

9. The in-vehicle communication device according to claim 2, wherein a second opening/closing unit is provided between the second voltage output unit and the CAN communication unit; and
   when a predetermined operation in the vehicle has been detected, the controller puts the second opening/closing unit into an open state and cuts off the supply of power from the second voltage output unit to the CAN communication unit.

10. The in-vehicle communication device according to claim 3, wherein a second opening/closing unit is provided between the second voltage output unit and the CAN communication unit; and
    when a predetermined operation in the vehicle has been detected, the controller puts the second opening/closing unit into an open state and cuts off the supply of power from the second voltage output unit to the CAN communication unit.

11. The in-vehicle communication device according to claim 4, wherein a second opening/closing unit is provided between the second voltage output unit and the CAN communication unit; and when a predetermined operation in the vehicle has been detected, the controller puts the second opening/closing unit into an open state and cuts off the supply of power from the second voltage output unit to the CAN communication unit.

\* \* \* \* \*